Jan. 3, 1967 W. GHISLER 3,296,453

PARAMETRIC INFORMATION TRANSFER CIRCUIT

Filed April 26, 1961 4 Sheets-Sheet 1

INVENTOR
WALTER GHISLER

BY [signature]
ATTORNEY

FIG. 10
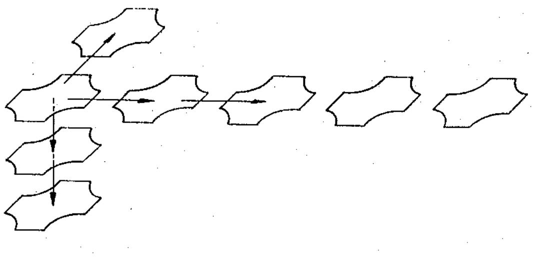
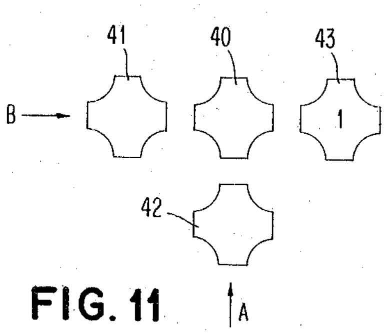
FIG. 11
| A \ B | 1 | 0 |
|---|---|---|
| 1 | 1(0) | 1(0) |
| 0 | 1(0) | 0(1) |
FIG. 12
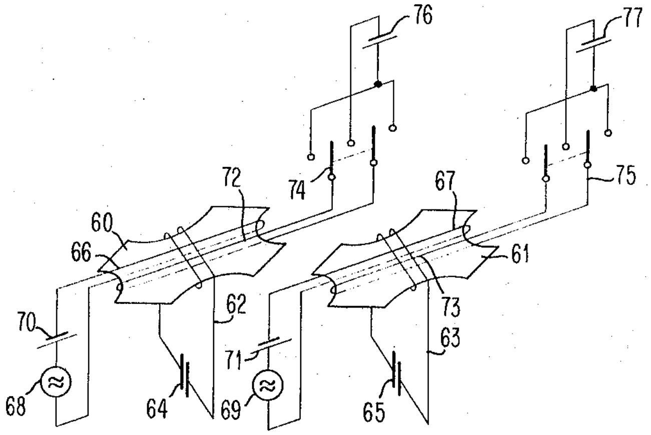
FIG. 13

3,296,453
PARAMETRIC INFORMATION TRANSFER CIRCUIT

Walter Ghisler, Southampton, England, assignor to International Business Machines Corporation, New York, N.Y., a corporation of New York
Filed Apr. 26, 1961, Ser. No. 105,714
Claims priority, application Switzerland, Aug. 29, 1960, 9,723/60
22 Claims. (Cl. 307—88)

This invention relates to a method of and means for operation of parametric computing units as well as a device for performing this method.

Parametric computing units, popularly referred to as "parametrons" in the prior art, have been developed in recent years. As will be explained in more detail later, parametrons are oscillating systems having a given resonant frequency, which are made to oscillate with frequency which is double the resonant frequency. The oscillations of a parametron can assume two phases, that is the phase 0 or $\pi$ with respect to a reference oscillation. Since the initially assumed phase of the oscillation of a parametron is maintained as long as the "pump oscillation" is supplied, it is possible to employ the phase as a dynamic information indicator. It will be seen that the parametron can store the information 0 and 1, corresponding to the phases 0 and $\pi$.

These prior art parametrons consist of a resonant circuit of customary design, that is, an inductance and a capacitance. Either the inductance or the capacitance is altered periodically with the pump frequency which is twice that of the resonant frequency of the oscillating circuit at the mean capacitance value or the mean inductance value. The oscillation thereby developed in the oscillating system thus corresponds to half the frequency of the pump field, while the phase is determined by the initial conditions at the start of the oscillation of the resonant system.

Parametrons of the variety mentioned can be assembled to form logical or computer elements and in this way can be employed for performing of calculating operations.

A prime object of this invention is to provide a method of and means for operation of parametrons whereby binary information can be transferred from one parametron to at least one further parametron in a simple manner.

Another object of this invention is to provide a method of and means by which storage and transmission of binary information is possible, wherein the sign or the phase of the transferred information can be selected freely but unvaryingly.

A further object of this invention is to provide a parametric computing unit which consists preferably of thin magnetic film elements and which enables information transfer from one layer to the next without recourse to coupling means.

Still another object of this invention is to provide a parametron with which the sign of the information transferred from one parametron to another parametron, that is the phase of the oscillation of the next parametron to be excited, can be controlled with respect to the oscillation of the first parametron.

Yet another object of this invention is to provide a mutual arrangement and performance of individual parametrons, such that the information from an individual parametron can be transmitted to a plurality of further parametrons with signs freely selectable.

Still another object of this invention is to provide an arrangement of individual parametrons such that the result obtained in the case of logical operations can be either positive or inverted.

These objects are achieved by employing a method for the operation of parametrons according to this invention wherein the transmission of binary information from at least one first parametron to at least one second parametron coupled therewith is provided by adjusting the resonant frequency of the second parametron from a first value, which is different from the half pump frequency, to said half pump frequency.

More specifically, a device for performing this method comprises at least two parametrons and is characterized in accordance with the invention in that the parametrons have a relationship with respect to each other, wherein at least the second parametron is provided with a tuning device for influencing the resonant frequency and that means are provided for the generation of a magnetic pump field.

The foregoing and other objects, features and advantages of the invention will be apparent from the following more particular description of preferred embodiments of the invention, as illustrated in the accompanying drawings.

In the drawings:

FIG. 10 is a diagrammatic representation of a spatial arrangement of parametrons consisting of magnetic layers, according to another embodiment of this invention.

FIG. 11 is an arrangement of parametrons for performing a simple logical operation, according to another embodiment of this invention.

FIG. 12 is a co-ordination table of simple logical operations.

FIG. 13 is a further parametric unit in which the magnetic layer serves as the core of an inductance of a resonant circuit according to another embodiment of this invention.

Figure 1:
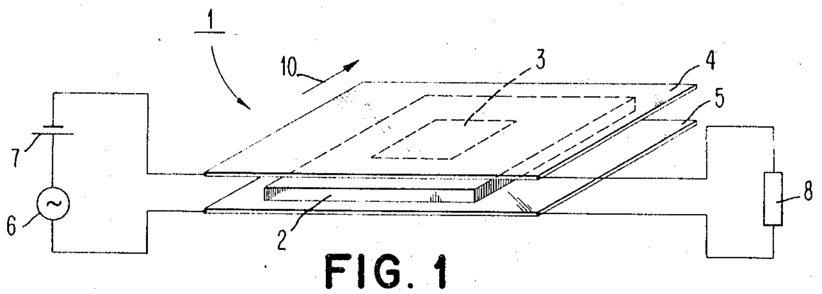
FIG. 1 is an illustration of a parametron comprising a thin magnetic film element, for explaining the physical phenomena.
Figure 2:
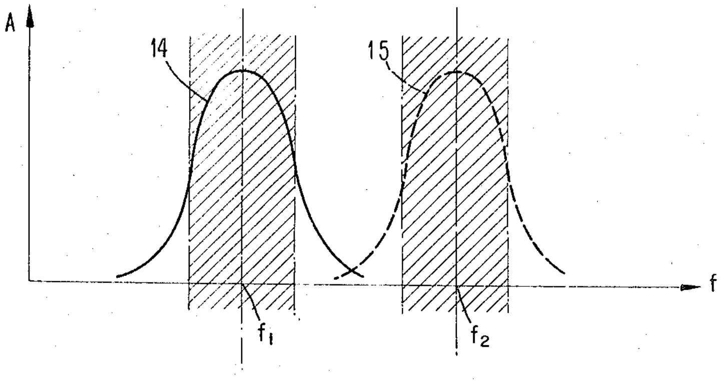
FIG. 2 is a graphical representation of the amplitude of the parametric oscillation of the parametron of FIG. 1 excited by an external field, in relation to the resonant frequency.

Referring to the FIG. 1, a parametron 1 is shown comprising a glass substrate 2 having a rectangular or square layer 3 of magnetic material, e.g. of iron-nickel alloy deposited thereon and capable of supporting ferromagnetic resonance. This layer or film 3 can be manufactured by evaporating the magnetic material onto the glass substrate 2 in a vacuum. A magnetic alternating field influences this layer. Two strip conductors 4 and 5, surrounding the layer 3, are provided for the generation of this alternating field. The strip conductors 4 and 5 are connected on the one hand to an A.C. generator 6 and a source of direct current 7; these are in series with respect to each other. To prevent reflections, the strip conductors are closed with a suitable impedance 8. With the arrangement shown, it is thus possible to generate a magnetic alternating field whose direction 10 lies in the plane of the layer 3. As a result of connecting the source of direct current 7, a magnetostatic field is produced around the layer 3, and the direction of this field is indicated by the arrow 10. The D.C. field as well as the A.C. field have an effect on the layer 3. If now the frequency of generator 6 is changed a resonant point exists at a certain frequency, in the manner illustrated in FIG. 2 wherein the frequency of the exciting oscillation is plotted as the abscissa and the amplitude of the natural oscillation of the magnetization of layer 3 as the ordinate. The magnetization thereby oscillates about the direction indicated by arrow 10 (FIG. 1). Curve 14 indicates a maximum of the amplitude at the frequency $f_1$ with a first D.C. component in conductor loops 4 and 5. If now the D.C. component in these loops is altered, increased, for example, the frequency of the resonant oscillation also increases, for instance in the manner indicated by the dotted curve 15 with the resonant point $f_2$.

It will therefore be seen that the magnetic layer 3 behaves like a resonant circuit, whereby the resonant frequency can be adjusted by the magnetic D.C. field which is produced by the strip conductors 4 and 5.

It is now assumed that the oscillation generated by generator 6 has a frequency which is twice the natural frequency of the magnetic layer at a given D.C. field. In this case, the magnetic layer 3 only oscillates when the oscillation to be excited is located in the frequency range indicated in FIG. 2 by the cross-hatched area. It will be clearly recognized that the natural oscillation of the magnetization of the layer, which shall be designated as the resonant frequency $f_r$, can assume two phase positions, whereby the oscillations of both phases have equal status from an energy point of view.

The phase at which the oscillations start is essentially coincidental, e.g. it depends upon minute remanences in layer 3, etc. The conditions are shown in greater detail in FIG. 3, which shows the oscillation curve plotted with respect to time. The oscillation $f_p$ of generator 6, referred to as pump frequency or pump oscillation in the following, fulfills the following condition:

$$f_p = 2.f_r$$

Curve 16 indicates by way of example the voltage of generator 6, the curve 17 represents the one possible oscillation in layer 3, and the dotted curve 18, the other possible oscillation in layer 3. The oscillations 17 and 18 of layer 3 are displaced by 180° with respect to each other.

If now a reference oscillation exists which, for example, is maintained continuously by generator 6 and which coincides with oscillation 17, it is possible at any time to establish whether the parametron stores the information "1" or "0," that is dependent upon whether the oscillation of the parametron is in phase or of opposite phase to the reference oscillation.

Figure 3:
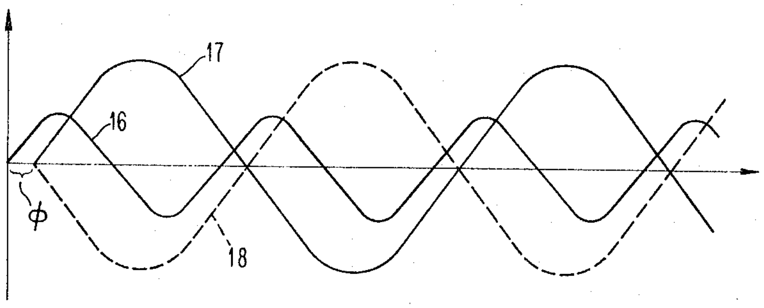
FIG. 3 is a diagrammatic representation of the parametric oscillations and also the pump oscillation of the parametron of FIG. 1.

FIG. 3 shows that the oscillations 17 and 18 are phase shifted with respect to the zero values of the exciting oscillation 16. The amount by which the phases are displaced is a function of the oscillation amplitude of the parametric oscillation. With increasing oscillation amplitude of the magnetization, the latter will lag increasingly with respect to the phase in the case of a very small amplitude of the same oscillation. This effect, which is apparent when a parametron is oscillating heavily, on a parametron which is building up oscillations, for instance, via a magnetic stray field coupling, can in most cases be neglected. It is possible to compensate by operating the parametrons on the capacitive resonant branch of the curve, that is, by adjusting the parametrons to a resonant frequency located somewhat below half the frequency of the pump field. This measure enables the phase to be displaced again. The corresponding adjustment of the resonant frequency can be achieved for instance by lowering the D.C. field component.

The arrangement shown in FIG. 1 depicts a parametric storage element which is capable of storing dynamically the information "1" or "0," whereby the information is determined by the phase value of the oscillation of layer 3 with respect to a reference phase. It is mentioned again that the phase is maintained for a storage of any desired length, provided the pump-oscillation maintains the natural oscillation of the layer. It is also mentioned that in the case of a plurality of parametrons of the kind described and with the same pump-oscillation source, all the parametrons which store the information "1" and all the parametrons which store the information "0" have the same phase value, respectively, since only two phase values are possible.

It was assumed so far that layer 3 is isotropic, which means that there is no preferred direction of magnetization in the plane of layer 3. Anisotropic layers can, however, also be visualized, that is layers having a so-called easy direction, that is, a direction of easiest magnetizability or preferred direction, which represents a stable position for the magnetization. A hard direction exists perpendicular to the easy direction.

Figure 4:
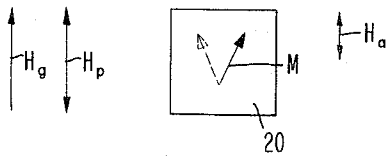
FIG. 4 is a diagrammatic arrangement of a parametron comprising an anisotropic magnetic element.

In order to explain the oscillation of an anisotropic layer, reference is made to FIG. 4. In the FIG. 4, a magnetic layer 20 is provided exhibiting an easy direction of magnetization indicated by a double arrow $H_a$. The magnetic pump field with the oscillation frequency $f_p$ is illustrated by a vector $H_p$; the D.C. field which in this case serves only to adjust the resonant frequency $f_r$ is designated by a vector $H_g$. In this case there exists, also without the external magnetic D.C. field $H_g$, a discrete resonant value of the oscillation of layer 20. It is now possible to visualize the oscillation in layer 20 to be represented by a vector M, which swings about the anisotropic direction $H_a$, in the manner indicated.

However, an arrangement is also possible employing an anisotropic layer to which an external field is applied perpendicular or at a definite angle to the anisotropic direction. The direction of the pump field will then be parallel to the resultant derived from the anisotropic field and the external field.

Figure 5:
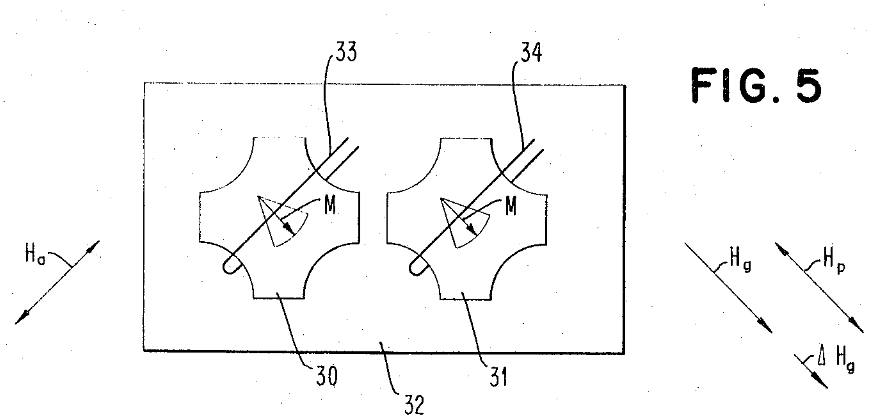
FIG. 5 is a unit consisting of two parametrons according to one embodiment of this invention.

Reference is now made to FIG. 5 in order to explain the mechanism of the transfer of information from one parametron to a second parametron. FIG. 5 shows two parametrons 30 and 31 on a carrier 32. The parametrons are essentially square shaped with concave corners. The purpose of this arrangement will be explained later. Both layers 30 and 31 are anisotropic exhibiting an easy direction of magnetization $H_a$.

Each layer 30 and 31 is surrounded by a strip conductor 33 and 34, respectively. These conductors enable each layer to be exposed to a magnetic D.C. field $H_g$ whose magnitude and polarity can be selected independently of the field of the neighboring layer. The strip conductors 33 and 34 thereby enable the ferromagnetic resonant frequency of a layer to be adjusted independently of the other layer. Both layers 30 and 31 are also exposed to a magnetic pump field $H_p$. Similar to the manner shown in FIG. 1, the generation of the field $H_p$ is provided by a strip conductor (connected to a magnetron) which surrounds the two layers 30 and 31, which is not shown in FIG. 5 for the sake of clarity.

For explanation, it is first assumed that the resonant frequency of both layers 30 and 31 is $f_r$ when an external D.C. field $H_g$ is applied in the hard direction, that is, when the conductor loops 33 and 34 conduct a current $I_g$. This causes a force to be exerted in a direction M as indicated in the FIG. 5. The frequency $f_p$ of the A.C. pump field is again twice that of the resonant frequency $f_r$ of the two layers when a magnetic D.C. field $H_g$ is present. Loop 34 on the other hand conducts a D.C. current which generates a field $H_g$ and $+\Delta H_g$ in the direction indicated, that is, its resonant frequency does not coincide with the alternating frequency of the magnetic pump field $H_p$ generated by the pump oscillation. Layer 31 will therefore not oscillate.

The arrangement shown with the two layers 30 and 31 located next to each other enables the stray field of layer 30 which oscillates with frequency $f_r$ also to influence layer 31, and endeavors to excite a corresponding oscillation therein. Since, however, in the example involved, layer 31 is not excited in the resonant frequency, the amplitude remains comparatively very small. Reference is now made to the FIG 6 which explains this oscillation lying outside the resonant frequency.

Resulting from the presence of a field $H_g$, the resonant frequency of layer 30 is, at frequency $f_r$, that is at a frequency which is assisted by the pump field $H_p$, and its amplitude as a function of the frequency is illustrated by a curve 51. Since in addition to the field $H_g$, the field $\Delta H_g$ is also present, the resonant frequency of layer 31 is above frequency $f_r$, for instance, at the frequency designated by $f_{r+}$. Curve 52 shows the oscillation amplitude of the element 31 as a function of the frequency. When a pump frequency $2f_r$ is applied to the elements 30 and 31 with a D.C. field $H_g$ applied to the element 30 and a D.C. field $H_g$ and $\Delta H_g$ applied to the element 31, the amplitude of the oscillation of element 30 is indicated by the point $A_{max}$ and the amplitude of the oscillation of element 31 by the point $A_{min}$. If now the resonant frequency of layer 31 is altered from $f_{r+}$ to $f_r$ by removing the field $\Delta H_g$, the oscillation of small amplitude is assisted by the pump field $H_p$ and is raised to an amplitude value of $A_{max}$. In this regard, it is worthy of note that the phase of the oscillation generated in this way in layer 31 is defined by the phase of the oscillation of element 30.

Figures 6, 7:
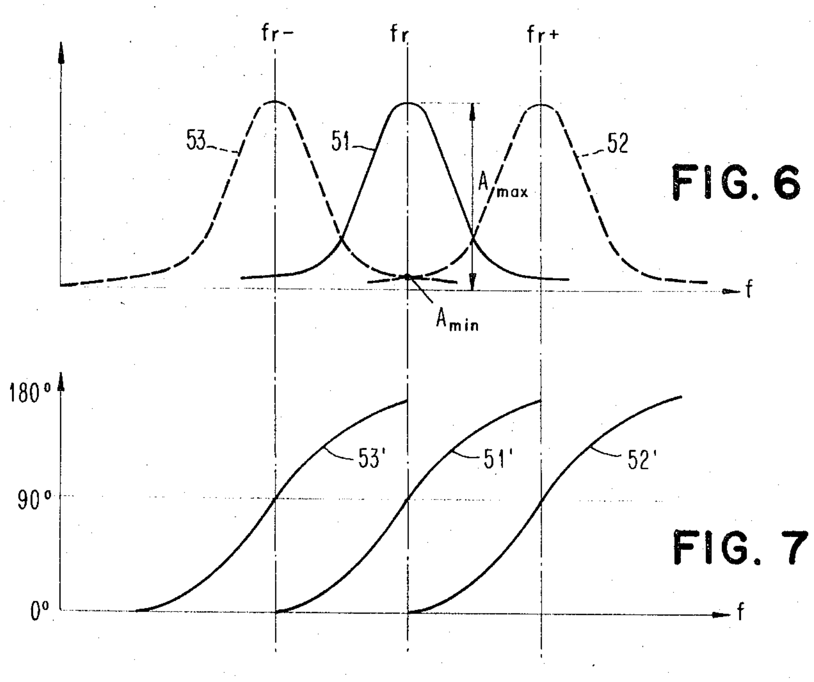
FIG. 6 is a graphical representation of the amplitude of the parametric oscillation generated by a pump field, at the resonant frequencies $f_r > \frac{1}{2} f_p$, $f = \frac{1}{2} f_p$ and $f_r < \frac{1}{2} f_p$.
FIG. 7 is the graphical representation of the phase of the oscillations of a resonant circuit as the resonant frequencies $f_r > \frac{1}{2} f_p$, $f_r = \frac{1}{2} f_p$ and $f_r < \frac{1}{2} f_p$.

The phase relationship between the exciting and the excited parametric oscillations is illustrated in FIG. 7. Curve 51' illustrates the phase for a parametron adjusted to the resonant frequency $f_r$, while curve 52' shows the phase of a parametron adjusted to the resonant frequency $f_{r+}$ with respect to the phase of the coupled parametric oscillation with the frequency $f_r$. In cases of detuning of the resonant frequency to $f_{r-}$ or $f_{r+}$, the parametrons are excited by a parametron tuned to the resonant frequency $f_r=\frac{1}{2}f_p$ for instance by stray coupling. It will be seen from FIG. 7 that the phase of the oscillations excited in parametrons tuned to the resonant frequency $f_{r-}$ and $f_{r+}$, are 180° phase displaced and that as a result the phase of the excited oscillation can be predetermined as a function of the direction of the detuning to lower or higher frequencies.

In the case where an adjustment is made to the resonant frequency $f_r$ from the frequency $f_{r+}$, the oscillation generated in layer 31 has the same phase as the oscillation in layer 30. If, on the other hand, the D.C. field $\Delta H_g$ generated by the conductor loop 34 is opposite to the direction illustrated in FIG. 5, that is opposite to the direction of vector $\Delta H_g$, the resonant frequency of layer 31 is lower than the frequency $f_r$, that is, at a frequency which is designated in FIG. 6 by $f_{r-}$. The corresponding resonance curve is illustrated by curve 53'. In this case, the phase of oscillation of element 31 is opposite the phase of the oscillation of layer 30, so that the oscillation which forms in layer 31 after removing the field $\Delta H_g$ as a result of the assistance afforded by the pump field $H_p$, is displaced by $\pi$ with respect to the phase of the oscillation in layer 30.

It will thus be seen that the information given by the phase position of an oscillation of a parametron can be transferred with the desired sign (that is positively or negatively) to another coupled parametron, e.g. another magnetic layer. The information transfer sign, that is, the fact whether the oscillations in the excited parametron are of the phase 0° or 180° with respect to the transferring parametron oscillations or to a reference oscillation, can therefore be determined by the choice of resonant frequency of the detuned layers. If the resonant frequency of the layer to which the information is to be transferred is above the frequency $f_r=\frac{1}{2}f_p(f_{r+})$, the transfer sign is positive, that is, the phases are the same (0°). If the detuned resonant frequency is less than the frequency $\frac{1}{2}f_p(f_{r-})$, the transfer sign is negative, that is, the phase of the transferred oscillation is opposite to the phase of the initial oscillation (180°). It is irrelevant, therefore, in which way the frequency is changed. Accordingly, by way of an example, it is possible to select the pump frequency $f_p$ so that the layers 30 and 31 only oscillate at frequency $f_r=\frac{1}{2}f_p$ when a D.C. current $\Delta I_g$ of predetermined magnitude flows through conductor loops 33 or 34; if in such a case the D.C. current $\Delta I_g$ is interrupted the natural frequency of the layer drops below $\frac{1}{2}f_p$.

The D.C. field $H_g$ can also be produced by means of a permanent magnet as well as by a current loop.

Figure 8:
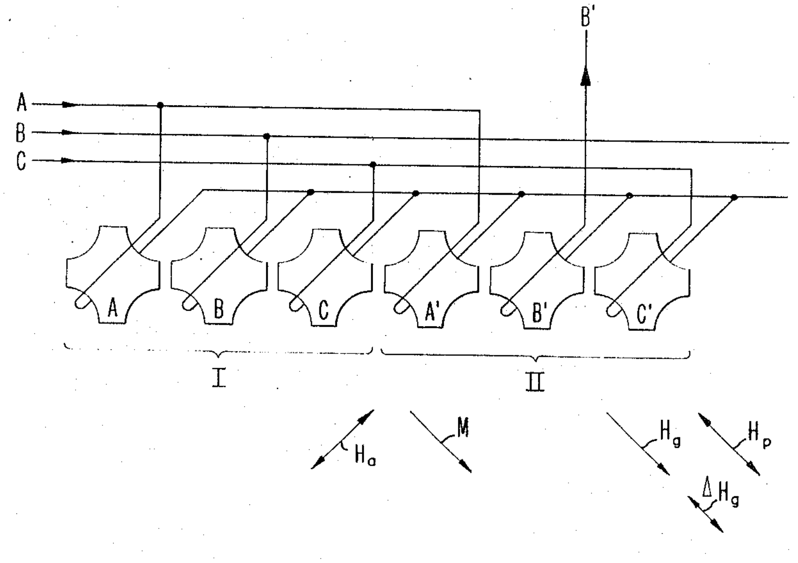
FIG. 8 is a shift register according to another embodiment of this invention.
Figure 9:
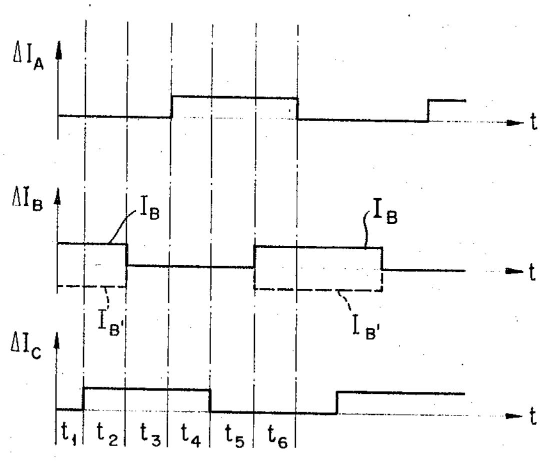
FIG. 9 is a graphical representation of the clock pulses for operating the shift register illustrated in FIG. 8.

With reference to FIGS. 8 and 9 there may now be explained a shift register as an example of an application of parametrons. Registers of this nature are employed for transporting information whereby the information can, if necessary, be extracted at any point of the register. The register illustrated in FIG. 8 consists of several groups, Group I and II of computing elements, each comprising three parametrons, A, B and C. It is assumed that all three units are anisotropic in the direction $H_a$ (easy direction) and with the external field $H_g$ applied, have a resonant frequency equal to half the pump frequency $f_p$. The pump field $H_p$ is generated in the direction of vector $H_p$ by means not shown in the drawing. Each parametron is surrounded by a conductor loop, whereby all parametrons A of each group are connected to a supply conductor A, the parametron B of Group I to a supply conductor B, the parametron B' to a supply conductor B' and all parametrons C to a supply conductor C. It is again assumed that the D.C. fields generated by the conductor loops are oriented in the direction of the vectors M, so that when a field $\Delta H_g$ is applied the resonant frequency is increased, except in the case of B'. Thus when information is transferred in Group I the sign is positive, that is the phase values of the oscillations transferring the information is not altered in the register.

Conductors A, B, B' and C transmit the clock signals which control the transfer of information through the register. In particular, six steps are visualized, as shown in FIG. 9; the latter figure illustrating the detuning currents $\Delta I_g$ in conductors A, B, B' and C with respect to time. In the following it is intended to explain in more detail the mode of operation of the register.

During a first time $t_1$, as illustrated in FIG. 9, the parametrons B and B' are virtually blocked by a pulse in conductor B and B', that is their resonant frequency is above and below, respectively, the frequency $\frac{1}{2}f_p$. The parametrons A and C, on the other hand, can oscillate at the resonant frequency $\frac{1}{2}f_p$ with a maximum amplitude. The phase value of the oscillation of parametron A thereby corresponds to information passing through the register.

During a second time $t_2$, the conductor C carries current, so that the parametron C is substantially blocked. As a result, oscillations emanating from parametron A excite parametron B. The residual oscillation of parametron B now aligns itself unambiguously with the phase of the oscillation in the A parametron. Thus, already at this point the phase position of the oscillation in parametron B is determined.

During a succeeding time step $t_3$, the flow of current in conductor B is discontinued, so that the oscillation in the B parametron is thereby completely released and the maximum amplitude $A_{max}$ is attained.

In a succeeding fourth time step $t_4$, the parametron A is blocked by current in the associated conductor so that only the B parametron stores information while the two neighboring parametrons A and C are substantially blocked. The parametron C, however, is now influenced exclusively by the oscillation in the B parametron, so that the phase position of the succeeding full oscillation is already established.

During a fifth time step $t_5$, the current in conductor C is now interrupted so that an oscillation of full amplitude can develop in the C parametron. Since the information is now contained in the C parametron, it is now possible, during a sixth time step $t_6$, to again block the B parametron by a current in the appropriate conductor loops.

It will be recognized that the information is shifted in a register of any desired length from the points A to the points C. At every step, however, the information can be extracted, for example, by elements located perpendicular to the direction of arrangement of the elements. As is still to be shown, it is possible to couple magnetically each parametron, as desired, direct with several additional parametrons. It should also be noted that every step must last for a certain period of time, amounting to several oscillations of the pump frequency. This is necessary because a finite period of time elapses after a parametron has been released until the oscillation of small amplitude has built up to the full amplitude $A_{max}$ as a result of the energy supplied by the pump field.

It is also possible for the information to be conveyed negatively (inversion) by the shift operation. The way this is achieved is shown for layer B′, which differs from the layer B in that the detuning current $I_B$ is of reverse polarity. While in the example shown the parametron B′ is tuned to a resonant frequency which is low relative quency which is high relative to one half the pump frequency $f_p$ and thus the information having the phase 0° is thereby taken over from parametron A, the element B′ is tuned to a resonant frequency which is low relative to one half the pump frequency $f_p$. Therefore, parametron B′ takes over the information from the neighboring parametron A′ with 180° phase shift. This represents an inversion.

The FIGS. 5 and 8 show that the individual parametrons are approximately square shaped, wherein the corners are cut off for instance in a concave manner; it will be noticed that the direction of anisotropy or the magnetic preferred direction, and correspondingly also the fields $H_p$ and $H_g$, are arranged diagonally. The concave corners of the parametric layers eliminate any undesired stray field couplings to the bordering parametrons in the diagonal directions. In addition they serve for the connection of the conductors. The individual parametrons can be located in a plane, however, the information should only be transferred along the rows and columns and not to the diagonally bordering parametrons.

The inclination of the direction of magnetization towards the edges nevertheless enables a stray field coupling with the adjoining parametrons in the columns and in the rows, since the components of the vectors M in the direction of the edges have the same value.

It is also possible to provide several planes of parametrons, in the manner shown in FIG. 10, wherein the planes are arranged so that the parametrons located above each other are in registry. A result of this measure is that the information can also be conveyed in the vertical direction since two parametrons located vertically one upon the other are also coupled magnetically. The distance between two neighboring planes can thereby be selected so that the stray field coupling between two parametrons which are in registry, is at least approximately of the same magnitude as the stray field coupling between two parametrons arranged side by side.

With reference to FIG. 11 there is explained briefly the way in which parametric units can be employed for the achievement of logical operations. The parametric units can be operated in accordance with the so-called majority logic. Since this principle is known it is only intended to explain a single embodiment. All the other applications can be constructed according to the same principle.

Referring to the FIG. 11, one parametron 40 is provided with three bordering parametrons 41, 42 and 43. Parametron 43 always oscillates with a phase displacement of 180° with respect to the reference phase and thus embodies the information "1." The input information A and B is now applied to the parametrons 41 and 42 and the result of the operation is obtained from parametron 40. If now, parametron 40 is not in resonance and the parametrons 41, 42 and 43 oscillate with full amplitude, an oscillation of smaller amplitude develops in parametron 40; this oscillation has a phase which corresponds to the majority of phase values conveyed by the stray fields. It will therefore be recognized that when either parametrons 41 or 42 oscillates with a phase corresponding to value "1," parametron 40 assumes this phase. As a result an "Or" arrangement is provided. The phase corresponding to information "0" develops in parametron 40 only when this phase is transmitted by both parametrons 41 and 42.

When, on the other hand, parametron 43 exhibits an oscillation phase corresponding to information "0," it is necessary for parametron 41 as well as for parametron 42 to oscillate in the information "1" phase in order that this information is taken over by the parametron 40 and an "And" circuit is therefore provided.

When information having a negative sign is to be transferred, that is when parametron 40 is biased by field $\Delta H_g$ in such a manner that the resonant frequency is less than $\frac{1}{2} f_p$, the transferred phase is exactly reversed, so that selectively the "And" and "Or" operation or the negation or inversion of the same can be obtained. The representation for the "Or" arrangement is shown in FIG. 12, wherein the data in brackets represent the inverted results (logical "Or" with simultaneous inversion).

The method in accordance with the invention has been shown with reference to parametrons which consist of thin magnetic layers. It is nevertheless desired to be stated that it is also possible to achieve in other parametrically excited oscillation systems than the thin film systems described, a transfer or processing of information in the same way, that is by briefly altering the resonant frequency selectively to higher or lower values.

An embodiment of a further type of parametric computing units is shown in FIG. 13. Two magnetic layers 60 and 61 are provided evaporated on a substrate which is not shown in the drawing, and are surrounded by a first loop conductor 62 and 63, each of which is connected to a capacitor 64 and 65, respectively. The layers 60 and 61 thus each form the magnetic core of a closed oscillatory circuit 62, 64 and 63, 65, respectively. The magnetic cores are in coupling relation with each other by their magnetic stray fields. The layers 60 and 61 are each provided with a further conductor loop 66 and 67, respectively, each of which is connected to a series circuit consisting of an A.C. generator 68 and 69, respectively, and a source of D.C. voltage 70 and 71, respectively. Finally each magnetic layer is surrounded by a third conductor loop 72 and 73, respectively, which is connected with a source of D.C. voltage 76 and 77 respectively through the double throw switches 74 and 75 respectively.

It is now assumed that the D.C. voltage sources 70 and 71 are proportioned so that the resonant frequency of the two parametrons is equal to half the frequency of the oscillation emanating from the A.C. generators 68 and 69 when the sources of current 76 or 77 are disconnected.

If now, the parametron, shown on the left in the FIG. 13, oscillates with a predetermined phase, it is possible to select by the appropriate position of double throw switch 75 the phase of the oscillation to be transmitted to the parametron on the right-hand side. The direction of the additional field $H_g$ generated by the source of voltage 77 determines the direction of the detuning of the resonant frequency with respect to the frequency $\frac{1}{2}f_p$, that is the frequency of the oscillation of the generators 68 and 69, and thus also the sign of the information transfer in the manner described and illustrated in connection with FIGS. 6 and 7. If the parametron shown on the right-hand side in the drawing is brought in resonance at a frequency $\frac{1}{2}f_p$ from a resonant condition corresponding to a frequency which is lower than $\frac{1}{2}f_p$, the information is taken over with a phase displacement of 180°, in the reverse case with 0°.

Mention is also made of the fact that the arrangement shown in FIG. 13 enables an information shift to be made from left to right as well as from right to left.

The basic principle of the present invention for the transfer of information is applicable to all parametrically excitable elements.

What is claimed is:

1. In an information transfer circuit, a controlling and a controlled parametric device, each said device tuned to resonate in one of a plurality of phase stable states and comprising, a magnetic element defining a portion of a flux path only, said devices arranged in field coupling relationship to one another so that stray fields from said devices couple one another, and means for momentarily detuning said controlled device such that said controlled device is established in a phase stable state dependent on the state of said controlling device.

2. The structure as set forth in claim 1, wherein said magnetic elements exhibit an anisotropic characteristic.

3. The structure as set forth in claim 2, wherein each said element is an octahedronally shaped element.

4. The structure as set forth in claim 3, wherein alternate sides of each said element are concave.

5. The structure as set forth in claim 4, wherein each said element exhibits a single easy axis of magnetization, with the easy axis of each said element oriented intermediate a pair of opposite concave sides of said core.

6. The invention as set forth in claim 2, wherein each said element is anisotropic exhibiting uniaxial anisotropy defining a single easy direction of magnetization and means for biasing each said element with a field applied substantially transverse with respect to the easy direction thereof.

7. The invention as set forth in claim 6, wherein said devices are arranged in field coupling relationship to one another with the easy direction each of said elements aligned substantially parallel to one another.

8. The invention as set forth in claim 6, wherein said means for momentarily detuning said controlled device comprises means for applying a further field of predetermined magnitude substantially transverse with respect to the easy direction of said element.

9. The invention as set forth in claim 8, wherein said further field is applied in opposition to said bias field.

10. In an information transfer circuit, a plurality of parametric devices each including resonant means having a predetermined resonant frequency, means for supplying energy to support each of said resonant means in a first or a second oscillatory phase state indicative of binary information, and means for momentarily detuning said resonant means in said plurality of devices in selected sequence, adjacent ones of said devices being coupled one to the other whereby a resonant means in one of said devices is effective to excite oscillations in the resonant means in an adjacent one of said devices when tuned to said resonant frequency.

11. An information transfer circuit as defined in claim 10 wherein said plurality of parametric devices are divided into groups and said detuning means are operative to detune concurrently said resonant means in corresponding devices in each of said groups in said selected sequence.

12. An information transfer circuit as defined in claim 10 wherein each of said resonant means includes a magnetic thin film element capable of supporting ferromagnetic resonance.

13. An information transfer circuit as defined in claim 12 further comprising first means for applying a constant magnetic field to each of said magnetic elements so as to establish said predetermined resonant frequency and wherein said detuning means includes means for applying superimposed magnetic fields to said thin film elements in said selected sequence.

14. In an information transfer circuit, a controlling parametric device and a controlled parametric device, each of said devices including resonant means having a same resonant frequency, means for supplying energy to sustain each of said resonant means in a first or a second stable oscillatory phase state, and first means for momentarily detuning said resonant means in said controlled device from said same resonant frequency, said resonant means in said controlling device being coupled so as to excite an oscillatory phase state in said resonant means in said controlled device when tuned to said same resonant frequency, said excited oscillatory phase state being supported by said energy supplying means to define a stable oscillatory phase state.

15. An information transfer circuit as defined in claim 14 wherein said first means is operative to detune said resonant means in said controlled device above or below said same resonant frequency whereby a same or an opposite oscillatory phase state, respectively, is excited in said resonant means in said controlled device.

16. In an information transfer circuit, a controlling parametric device and a controlled parametric device, each of said parametric devices including resonant means having a predetermined resonant frequency and comprising magnetic elements arranged in field coupling relationship one to the other, means for supplying energy to sustain said resonant means in a first or a second oscillatory phase state, and means for momentarily detuning said resonant means in said controlled device whereby coupling fields generated by said resonant means in said controlling device are effective to excite an oscillatory phase state in said resonant means in said controlled device, said excited oscillatory phase state being supported by said energy supplying means when said resonant means in said controlled device is again tuned to said predetermined resonant frequency.

17. An information transfer circuit as defined in claim 16 wherein said magnetic elements in said controlling and said controlled parametric devices are in the form of thin films and arranged in a same plane.

18. An information transfer circuit as defined in claim 16 wherein said magnetic elements in the said controlling and said controlled parametric devices are in the form of thin films and arranged in parallel planar arrangement.

19. An information circuit as defined in claim 16 wherein said magnetic elements are in the form of thin films exhibiting anisotropic characteristics and further including means for applying magnetic fields transverse to the defined easy axis of said thin films to establish said predetermined resonant frequency.

20. An information transfer circuit as defined in claim 16 wherein said magnetic elements are in the form of thin films and capable of supporting ferromagnetic resonance.

21. In an information transfer circuit, a plurality of controlling parametric devices and a controlled parametric device, each of said parametric devices including resonant means having a predetermined resonant frequency, said resonant means in said plurality of controlling parametric devices being coupled to said resonant means in said controlled device, pump means for supplying energy to sustain said resonant means in said controlling and said controlled devices in a first or a second oscillatory phase stable state, and means for momentarily detuning said resonant means in said controlled device from said predetermined resonant frequency whereby said controlling devices are effective to excite an oscillatory phase state therein defined by the oscillatory phase states of the majority of said controlling devices, said excited oscillatory phase state being supported by said pump means when said controlled device is again tuned to said predetermined resonant frequency.

22. An information transfer circuit as defined in claim 21 wherein at least one of said plurality of controlling parametric devices is continuously sustained in said first oscillatory phase state.

References Cited by the Examiner

UNITED STATES PATENTS 3,134,024 5/1964 Sterzer ---------------- 307—88

OTHER REFERENCES

Proceedings of the National Electronics Conference, 1959, pp. 65 to 78.

BERNARD KONICK, *Primary Examiner.*

IRVING SRAGOW, *Examiner.*

R. R. HUBBARD, S. URYNOWICE, *Assistant Examiners.*